April 6, 1954  R. B. TAKEWELL ET AL  2,674,522
APPARATUS FOR PELLETIZING CARBON BLACK
Filed June 21, 1946
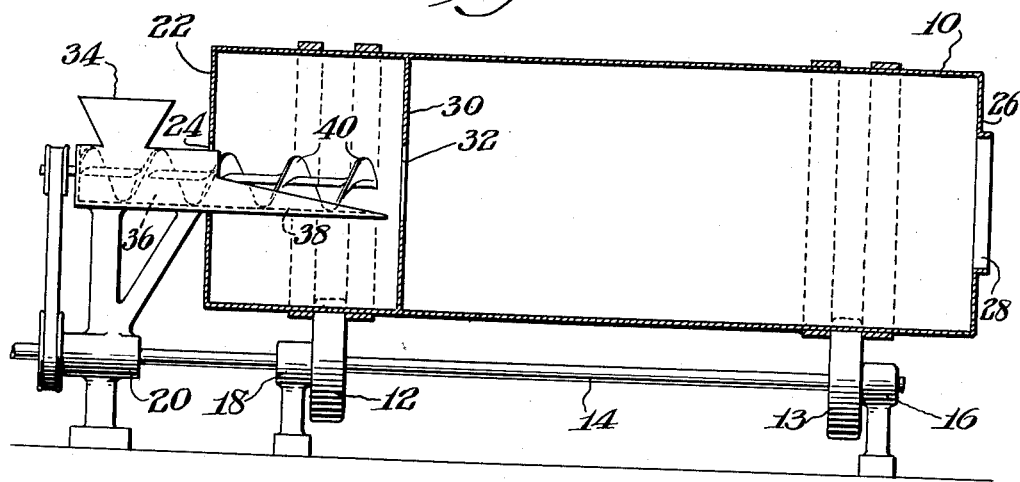
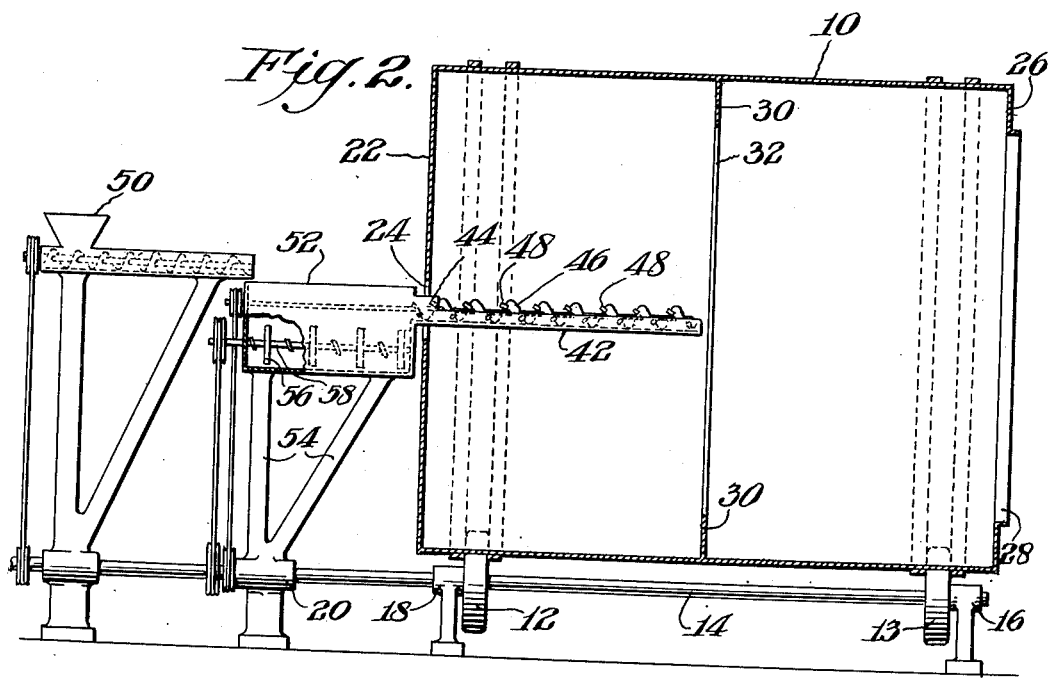
INVENTORS
Robert B. Takewell and
Frank W. Selfridge
By
Edwin C. Woodhouse
ATTORNEY Patented Apr. 6, 1954

2,674,522

UNITED STATES PATENT OFFICE 2,674,522

APPARATUS FOR PELLETIZING CARBON BLACK

Robert Boyce Takewell and Frank W. Selfridge, Borger, Tex., assignors to J. M. Huber Corporation, Borger, Tex., a corporation of Delaware Application June 21, 1946, Serial No. 678,280

2 Claims. (Cl. 23—314)

This invention relates to a process and apparatus for pelletizing carbon black and, particularly, to improvements therein whereby production may be increased, better pellets may be obtained and the properties of the pellets may be better controlled.

Carbon black, such as channel black, lamp black and furnace black, as originally produced is in the form of an extremely fine dusty powder with the particles colloidal in size. It is a light fluffy material, having an apparent density of from about 3 to about 5 lbs. per cubic foot and is extremely difficult to handle and transport. It has been found that channel black may be caused to agglomerate into the form of small pellets which are self-supporting so that they may be handled readily, shipped in tank cars, poured down shutes, and the like, without forming objectionable amounts of dust and yet are frangible so that they readily break down to a fine powder on pressing between the fingers or on mixing with viscous materials such as rubber and the like. Such pellets of carbon black are commonly known as compacted carbon and the apparatus as compacting apparatus or compactors.

One process and type of apparatus, which has been employed successfully in commerce for pelletizing channel black, is that disclosed in Patent 2,164,164 issued June 27, 1939 to H. W. Price. The process of Price employs a horizontal rotating drum divided into sections by partitions, having central openings, with rollers in the first two or three compartments. The raw channel black is fed into the end of the first compartment containing a roller. As the drum is slowly rotated, the bed of carbon black is carried by the drum until the upper surface thereof is slowly brought to an inclination slightly greater than the angle of repose of the carbon particles so that successive increments of the mass of black roll and tumble down the inclined surface of the bed and gradually advance toward the exit end of the drum. In the compartments containing the rollers, the black is pressed by the rollers and its apparent density greatly increased without the formation of any substantial amount of pellets, the rollers tending to break up any pellets which may start to form. In the compartments which do not contain rollers, the black is no longer subjected to the action of the rollers and, hence, is free to agglomerate into the form of pellets so that by the time that the black reaches the exit end of the drum, substantially all of the black is in the form of substantially dustless, self-sustaining, free-flowing pellets.

The Price process can also be employed without the rollers and with or without the partitions. If the black has not been densified, it will be necessary to feed the black at a slower rate so that the black and the pellets will be sufficiently densified to produce pellets of the desired density. Other things being equal, the density of the pellets and their surface polish will depend upon the length of time that they are subjected to the rolling and tumbling action, longer periods of rolling and tumbling producing pellets of greater density and more surface polish. The period of time required to produce pellets of any particular density will depend upon the character of the carbon and its apparent density when fed into the drum. With channel black, it is generally desired to produce pellets having an apparent density of from about 21 lbs. to about 23 lbs. per cubic foot.

Furnace carbon is carbon black which is produced by the incomplete combustion of a hydrocarbon fuel inside a highly refractory furnace. Furnace carbon does not pelletize as readily as channel black. When it has been attempted to pelletize furnace carbon by the prior art methods, such as the Price method, the pellets are produced at a very low rate and are dusty and of low density and strength unsatisfactory for many purposes. In general, pellets of furnace carbon, in order to be satisfactory, should have a density of at least 21 lbs. per cubic foot and usually from about 30 lbs. to about 37 lbs. per cubic foot.

It is an object of the present invention to provide a method for the more rapid conversion of carbon black to pellets. Another object is to provide a method for the production of carbon black pellets of greater density. A further object is to provide a method for the production of satisfactory pellets from furnace carbon. A still further object is to provide new and improved apparatus for pelletizing carbon black. Other objects are to advance the art. Still other objects will appear hereinafter.

The above and other objects may be accomplished in accordance with our invention which comprises forming a substantially horizontal bed of dry carbon black with a substantially rectangular longitudinally inclined upper surface at least 16 inches long, slowly moving such bed through an arc transverse of its longitudinal axis so that the upper surface is brought to a lateral inclination slightly greater than the angle of repose of the carbon black particles and such particles are caused to roll and tumble down the inclined upper surface, while subjecting the particles to the pressures exerted solely by the weight of the carbon black, until the particles agglomerate to form free-flowing, substantially dustless, self-sustaining pellets, gradually withdrawing pellets from the exit end of the bed as they are formed, and feeding fresh carbon black to the entrance end of the bed at the rate at which carbon black is withdrawn from the exit end, the fresh carbon black being fed to the upper surface of the bed over a distance of from about one foot to about three-fourths the length of the bed.

This process may be carried out in a horizontal rotating drum of the character employed in the practice of the Price method by feeding the fresh carbon black to the surface of the mass of carbon black in the drum over a distance of from about one foot to about three-fourths the length of the surface measured from the entrance to the drum, i. e., the beginning of such surface. Heretofore it has been the practice, in operating the rotating drum type of pelletizing machine, to introduce the black directly into the end of the rotating drum whereby a relatively large amount of loose black is deposited in one small area adjacent the entrance to the drum. The mass of loose black absorbs any pellets which have been formed and cushions them in such a manner that pellet growth is greatly retarded. If it is attempted to increase the rate of introduction of loose black into the drum in this manner, the loose black advances to the discharge end of the drum before pellets are formed and the drum soon becomes completely clogged with loose black so that the black will not flow through it and the drum is rendered inoperative. We have found that this condition can be largely eliminated and the rate of feed of carbon black to the drum can be greatly increased if the fresh black is fed or distributed over a substantially increased area of the surface of the mass of black in the drum so that any local excess of loose black is avoided.

Suitable apparatus for carrying out our improved process is shown in the accompanying drawings, in which:

Fig. 1 is a side elevation, partly in section, diagrammatically illustrating one embodiment of our invention;

Fig. 2 is a side elevation, partly in section, diagrammatically illustrating a second embodiment of our invention, and in particular, a surge tank in combination with the feeding means and drum.

Referring first to Fig. 1, the rotatable drum 10 is supported on rollers 12 and 13 carried by a shaft 14 mounted in bearings 16, 18 and 20 and connected with a suitable source of power not shown. The rollers support the drum and cause it to rotate and are constructed and operated as in Patent 2,164,164. Other suitable means for rotating the drum will be apparent to those skilled in the art.

The end wall 22 of the drum is provided with an inlet opening 24 at its center. The end wall 26 is provided with an outlet opening 28 which is somewhat larger than the inlet 24 so that there will be a feed of carbon through the drum due to the building up of a head of carbon near the inlet end and the decrease in volume of the carbon as it increases in density toward the discharge end. A partition 30 is shown spaced a short distance from the inlet end and having a central opening 32 larger than the inlet opening 24. Additional partitions may be placed in the drum if desired. These partitions tend to retard the flow of the carbon through the drum and are desirable in some cases, particularly where the drum is less than 12 feet in length. Usually, however, the partitions are unnecessary and may be omitted.

The feeding means, as illustrated in the modification of Fig. 1, comprises a hopper 34 through which fresh carbon is fed into the feed pipe 36 which extends into the inlet opening 24. To the end of the feed pipe, there is attached a trough 38 which may be made integral with the feed pipe. The sides of the trough adjacent the feed pipe are about one-half the height of the feed pipe and slope downwardly to a height of about zero at the end of the trough. A feed screw 40 extends through the feed pipe and the trough to feed the fresh carbon into the drum. As the feed screw feeds the carbon, it raises it slightly and causes some of the carbon to be spilled over the sides of the trough and to be dropped onto the surface of the bed of carbon in the drum over a distance corresponding to the length of the trough. The trough may vary from one foot in length to a length corresponding to about three-fourths the length of the drum. As illustrated in Fig. 1, the trough is 18 inches in length and the drum is 6 feet in length.

Fig. 2 shows a drum 10 similar to that in Fig. 1 but of substantially larger size. The means for supporting and rotating the drum are similar to those for rotating the drum of Fig. 1. In Fig. 2, the annular partition 30 is shown as placed near the center of the drum. Fig. 2 shows a modified form of trough 42 and feeding means with the sides of the trough being about one-half the height of the feed pipe 44 and feed screw 46 for the length of the trough. That part of the feed screw which works in the trough is provided at intervals with small paddles 48 which lift the black and cause it to flow over the sides of the trough whereby the black is fed to the upper surface of the bed of carbon in the drum over a distance corresponding to the length of the trough. The trough in this case is shown to extend into the drum for about one-half the length of the drum.

Fig. 2 also illustrates a further important feature of our invention in that the raw carbon dumped into the hopper 50 is fed therefrom into a surge tank 52 at the end remote from the drum. The surge tank is supported as shown at 54. The surge tank is also provided with agitating means comprising paddles 56 mounted on a shaft 58. The paddles are slowly rotated whereby the carbon black is agitated and its density increased. The paddles are mounted at an angle to slowly feed the carbon toward the end of the surge tank nearest the drum where the densified carbon will be picked up by the feed screw 46. With the feeding means heretofore used and with the feeding means of Fig. 1, there is a tendency for a heavy sudden slug of carbon to be fed into the end of the drum which slug will fill the drum with loose carbon black so that it will cease to form pellets. By the use of the surge tank 52, any sudden rush or slug of carbon black will be fed therefrom to the drum at a more uniform rate.

The drums may be of any desired size. Practically, they should be at least 8 inches in diameter and at least 16 inches long, and preferably, at least 6 feet long and at least 2 feet in diameter. For the production of pellets on a large commercial scale, they will usually be from about 6 to about 10 feet in diameter and from about 12 to about 30 feet in length.

The feeding means should be so constructed as to feed and distribute the carbon black over a distance of at least one foot of the length of the drum and up to about three-fourths of such length. The feed of fresh black may be over a greater distance but generally this will be undesirable as it usually results in the discharge of some unpelletized black. Preferably, the feed of fresh carbon will be over a distance of from about one-fourth to about one-half the length of the drum, particularly in drums up to 12 feet long.

The drums may be rotated at any speed which will produce the desired rolling and tumbling action and which is below that speed which will carry the black well toward the top of the drum and cause it to fall freely or cascade back onto the surface of the bed of black. Usually the drums will be rotated at from about 4 to about 18 revolutions per minute, the maximum speed depending on the diameter of the drum.

In operation, the drum will be charged with pelletized or partly pelletized carbon black sufficient so that when the drum is rotated the carbon black will begin to be discharged from the discharge end. In other words, the drum should be brought to a condition approaching the condition of equilibrium under which it is to be operated during continuous operation. Such a condition can be reached by feeding the carbon black slowly into the rotating drum until it is filled to the desired extent with densified and partly pelletized carbon black. The mass of carbon black in the drum forms a substantially horizontal bed having a substantially rectangular upper surface. As the drum is slowly rotated, the upper surface of the bed of carbon is brought to an inclination slightly greater than the angle of repose of the carbon black particles. This causes the top carbon black particles to roll and tumble down the inclined upper surface whereby they gradually agglomerate to form free-flowing, substantially dustless, self-sustaining pellets. Continued rotation of the drum brings fresh increments of the mass of carbon black to the top to be rolled and tumbled down the surface of the carbon black. As fresh carbon is gradually fed into the drum, it forms a head of carbon which causes the upper surface to be inclined downwardly toward the discharge end and the carbon to gradually advance to the discharge end. The advance of the carbon toward the discharge end is also caused by the fact that, as the particles roll and tumble down the inclined surface of the bed of carbon and the lower layers of the bed of carbon are subjected to the pressures of the layers above them, the carbon black is densified and the pellets have an apparent density much greater than that of the fresh carbon fed into the drum. Due to this increase in density, the portions of the carbon black near the discharge end occupy less space than those portions near the inlet end and, hence, the bed of carbon has its surface inclined downwardly toward the discharge end. The inclination of the surface of the bed toward the discharge end and the desired movement of the carbon toward such end may be obtained by mounting the drum in an inclined position.

The feed of carbon is regulated in accordance with the speed of rotation of the drum and the length of the drum so that the pellets being discharged from the drum will have the density desired. By feeding the fresh carbon over a substantial area of the surface of the bed of carbon in the drum the pellets are formed at a greatly increased rate and are more spherical in form. Furthermore, the formation of relatively large masses of loose carbon at any one place is largely avoided whereby the rate of feed of the carbon may be greatly increased without clogging of the drum and rendering it inoperative. Thereby we are able to more rapidly produce more perfectly formed pellets of higher density.

The advantages of our process and apparatus are particularly apparent and most notable in the treatment of furnace black. By our process and apparatus we are able to obtain pellets from furnace black which will have the desired density and strength for commercial use.

Our process and apparatus may be employed in the treatment of unagitated carbon black, that is, carbon black of an apparent density of 3 to 5 lbs. per cubic foot. Our process and apparatus may also be used with agitated carbon black, that is, carbon black which has had its apparent density substantially increased by agitation. Our apparatus and process will pelletize more carbon and produce pellets of greater density if the carbon is first densified, particularly to a density of over 10 lbs. and up to about 18 lbs. per cubic foot. The carbon black may be densified by any conventional means, such as by stirring with paddles or pins in a bin. It may be densified by the method and apparatus shown by Price in Patent 2,185,158. The use of agitated carbon black not only increases the capacity of the pelletizing apparatus, but also practically eliminates the dust inside the machine so that less dust is discharged with the carbon black pellets.

In order to more clearly illustrate our invention, preferred modes of carrying the same into effect and the advantageous results to be obtained thereby, the following examples are given:

*Example I*

A compacting drum, 2 feet in diameter and 6 feet in length and having a partition 8 inches high spaced 18 inches from the inlet end, and walls at the exit end 6 inches high, was rotated at a speed of 18 revolutions per minute. Furnace carbon, prepared by the incomplete combustion of a mixture of gas and oil and weighing about 5 lbs. per cubic foot, was fed immediately into the end of the drum at a rate of 14 lbs. per hour. Reasonably uniform and dustless pellets of a density of 25 lbs. per cubic foot were formed. When the rate of feed was increased to 18 lbs. per hour, the drum became filled with loose black and no pellets were formed.

The apparatus was then equipped with a distributor, such as that shown in Fig. 1 and extending about 18 inches into the drum. The drum could now be operated at a feed rate of 25 lbs. of carbon per hour with the formation of perfect pellets of a density of 32 lbs. per cubic foot.

Some of the same furnace carbon was pre-agitated to a density of 15 lbs. per cubic foot in a conventional agitator bin by means of pins attached to a rotating shaft. When this carbon was fed into the drum through the distributor, the capacity of the drum was increased to 32 lbs. of carbon per hour and the density of the pellets increased to 36 lbs. per cubic foot. The dust also disappeared from the atmosphere inside the drum.

*Example II*

A commercial drum compactor, 10 feet in diameter and 12 feet long with a partition one foot high in the center, was operated with unagitated furnace carbon having a density of about 4 lbs.

per cubic foot at the rate of 210 lbs. per hour with the carbon being introduced directly into the end of the drum. Fair pellets, weighing 27 lbs. per cubic foot, were produced. Attempts to operate at a feed rate of 250 lbs. per hour resulted in complete failure to form pellets. The drum was then equipped so that the incoming black was distributed evenly along the length of the first six feet of the drum as shown in Fig. 2. The drum could now be operated at a feed rate of 420 lbs. per hour with the formation of more perfectly formed spherical pellets which had a density of 37 lbs. per cubic foot.

*Example III*

The drum compactor of Example II will compact unagitated channel black at the maximum rate of 25,000 lbs. per day, without the distributor feed of our invention, to form somewhat irregular shaped pellets having a density of 21 lbs. per cubic foot, the carbon being charged directly into the end of the drum. When the carbon was distributed over the first four feet of the drum by the use of the feed means of Fig. 2, the pellets were more spherical in nature, more free flowing and the density was 23 lbs. per cubic foot. The capacity of the machine was increased to 35,000 lbs. per day.

It will be understood that the specific embodiments of the apparatus shown in the drawings and heretofore described, and the particular modes of operation given in the examples, are all given for illustrative purposes solely. Many variations and modifications can be made in the form of the apparatus and in the manner of operating the process without departing from the spirit or scope of our invention. For example, other forms of feeding means may be employed which will distribute the carbon over a substantially extended surface, such as by introducing the carbon black through a fan or revolving paddle wheel or by the use of a reciprocating feed means. Still other types of feeding means will be apparent to those skilled in the art. Our type of feeding means may be applied to the apparatus of Patent 2,164,164 at the entrance to the first compartment containing a roller or an equivalent feed means may be provided for the discharge of the carbon from the last compartment containing a roller to the first compartment which does not contain a roller, or at both such points. The drums may be provided with internal scrapers or other auxiliary equipment as desired. Also, other means than a drum may be used for the formation and maintaining of a bed of carbon and inclining it so that the particles of carbon will be continually rolled and tumbled over a surface formed of similar carbon particles until the carbon is agglomerated into the form of pellets. Further, our apparatus and process may be used for the treatment of materials other than carbon black. Accordingly, we intend to cover our invention broadly as in the appended claims.

It will thus be apparent that, by our invention, we have provided a novel and improved process and apparatus for producing improved pellets of carbon black, and the like, at a greatly increased rate in a simple and efficient manner.

We claim:

1. Apparatus for pelletizing dry carbon black which comprises a horizontal drum at least 16 inches long mounted for rotation about its horizontal axis, a wall at the inlet end of the drum provided with an inlet opening at its center, a wall at the other end of the drum having an outlet opening at its center substantially larger than the inlet opening, means for slowly rotating the drum, a surge tank adjacent the inlet end of the drum, feeding means at the end of the surge tank that is remote from the drum feeding raw carbon black to the surge tank at such end, a feeding agitator in the surge tank for densifying the carbon black and forcing it to the end of the tank nearest the drum, and a controllable positive feed distributor extending from the near end of the surge tank through the inlet opening into the drum for a distance within the range of about one-fourth to about three-fourths the length of the drum and having carbon black discharging means throughout such distance.

2. Apparatus for pelletizing dry carbon black which comprises a horizontal drum at least 6 feet long mounted for rotation about its horizontal axis, a wall at the inlet end of the drum provided with an inlet opening at its center, a wall at the other end of the drum having an outlet opening at its center substantially larger than the inlet opening, means for slowly rotating the drum, a surge tank adjacent the inlet end of the drum, feeding means at the end of the surge tank that is remote from the drum feeding raw carbon black to the surge tank at such end, a feeding agitator in the surge tank for densifying the carbon black and forcing it to the end of the tank nearest the drum, a feed pipe extending from the near end of the surge tank through the inlet opening in the drum, a trough connected with the end of the feed pipe and extending into the drum for a distance within the range of about one-fourth to about three-fourths of the length of the drum, a feed screw extending through the pipe and the trough positively feeding densified carbon black from the surge tank through the feed pipe and the trough and forcing carbon black over the walls of the trough.

References Cited in the file of this patent

UNITED STATES PATENTS

| Number | Name | Date |
|---|---|---|
| 1,713,568 | Swenson | May 21, 1929 |
| 2,052,329 | Wendeborn | Aug. 25, 1936 |
| 2,127,137 | Price | Aug. 16, 1938 |
| 2,131,686 | Heller et al. | Sept. 27, 1938 |
| 2,164,164 | Price | June 27, 1939 |
| 2,185,158 | Price | Dec. 26, 1939 |
| 2,213,056 | Skoog et al. | Aug. 27, 1940 |
| 2,263,118 | Carney | Nov. 18, 1941 |
| 2,311,154 | Carney | Feb. 16, 1943 |
| 2,503,361 | Studebaker | Apr. 11, 1950 |